United States Patent [19]
Fucito

[11] Patent Number: 5,333,094
[45] Date of Patent: Jul. 26, 1994

[54] TRANSIENT REDUCTION CIRCUIT
[75] Inventor: Dermot T. Fucito, Norcross, Ga.
[73] Assignee: Northern Telecom Limited, Montreal, Canada
[21] Appl. No.: 899,867
[22] Filed: Jun. 17, 1992
[51] Int. Cl.⁵ .............................................. H02H 7/20
[52] U.S. Cl. ...................................... 361/91; 361/58; 361/111
[58] Field of Search ..................... 361/91, 92, 58, 111

[56] References Cited
U.S. PATENT DOCUMENTS
4,245,270  1/1981  Busby .................................... 361/58

Primary Examiner—Marc S. Hoff
Assistant Examiner—S. Jackson
Attorney, Agent, or Firm—Foley & Lardner

[57] ABSTRACT

A transient reduction circuit is provided for use in an arrangement including a backplane having at least two conductors, a power supply connected to the conductors, and a plurality of circuit cards attached to the backplane and connected to the conductors. Each of the plurality of circuit cards includes a transient reduction circuit having inputs for connection to the power supply output and a reference potential, a transistor having an emitter connected to the power input, a collector connected to the load and a base, a resistor connected between the base and the reference potential input, and a decoupling capacitor connected between the collector and the reference potential input. When the cards are powered the transistor is turned on and saturates, thus introducing only a 0.1 V drop in the power supply line. A sudden decrease in power supply voltage output is prevented from discharging the decoupling capacitor by a reverse biased base-collector junction in the transistor.

4 Claims, 1 Drawing Sheet

TRANSIENT REDUCTION CIRCUIT

This invention relates to transient reduction circuits and is particularly concerned with reducing discharge transients on a circuit's capacitively decoupled voltage supply line caused by a sudden application of capacitive loads on the power supply line.

BACKGROUND OF THE INVENTION

In systems, such as telecommunications systems, it is often necessary to exchange circuit packs or cards while the remaining circuit packs or cards are in an operating state. If such a circuit pack or card presents a capacitive load to the power supply line(s), the enabling of the circuit will place a capacitive load on the power supply line(s) that may adversely affect the operation of the operating circuits. To mitigate this problem such circuit packs or cards are often provided with decoupling capacitors on the voltage supply inputs. Chokes may also be installed to reduce the effect of these discharge transients.

A diode in series with the load would allow charging the decoupling capacitor and prevent discharging during a dip in the power supply voltage, but may introduce an unacceptably large voltage drop for most applications.

SUMMARY OF THE INVENTION

An object of the present invention is to provide an improved transient reduction circuit.

In accordance with an aspect of the present invention there is provided in a circuit card having a resistive load for connection to a power supply shared with other circuit cards, a transient reduction circuit, comprising: inputs for connection to the power supply output and a reference potential; a transistor having an emitter connected to the power input, a collector connected to the load and a base; a resistor connected between the base and the reference potential input; and a decoupling capacitor connected between the collector and the reference potential input; whereby a sudden decrease in power supply voltage output is prevented from discharging the decoupling capacitor by a reverse biased junction in the transistor.

An embodiment of the present invention further comprises a delay element connected between the resistor and the reference potential input.

In accordance with another aspect of the present invention there is provided an arrangement including a backplane having at least two conductors, a power supply connected to the conductors, and a plurality of circuit cards attached to the backplane and connected to the conductors, each of the plurality of circuit cards including a transient reduction circuit comprising: inputs for connection to the power supply output and a reference potential; a transistor having an emitter connected to the power input, a collector connected to the load and a base; a resistor connected between the base and the reference potential input; and a decoupling capacitor connected between the collector and the reference potential input; whereby a sudden decrease in power supply voltage output is prevented from discharging the decoupling capacitor by a reverse biased junction in the transistor.

An advantage of the present invention is that the effectiveness of the decoupling capacitor is enhanced without having to increase its value.

BRIEF DESCRIPTION OF THE DRAWINGS

The present invention will be further understood from the following description with reference to the drawings in which.

Similar references are used in different figures to denote similar components.

DETAILED DESCRIPTION

Figure 1:
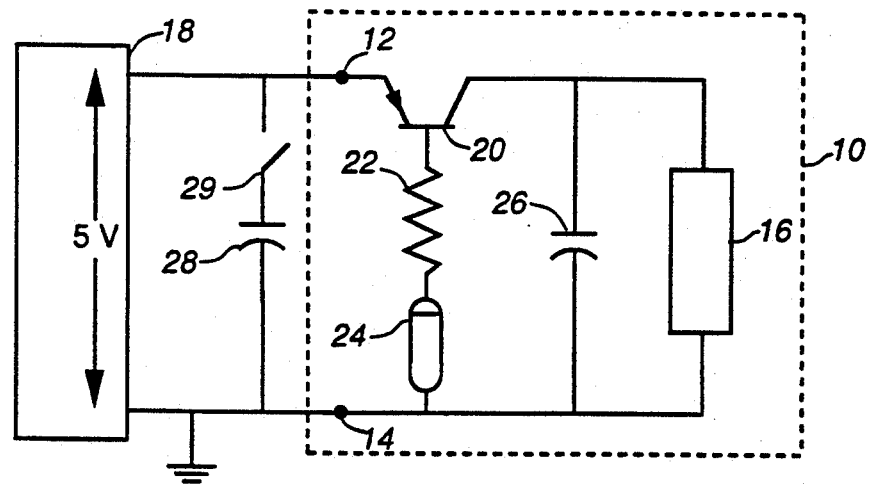
FIG. 1 schematically illustrates a transient reduction circuit in accordance with an embodiment of the present invention.

Referring to FIG. 1, there is schematically illustrated a transient reduction circuit in accordance with an embodiment of the present invention. A circuit card 10 has inputs 12 and 14 for connection of its resistive load 16 to a power supply 18. A transient reduction circuit connected between the inputs 12 and 14 and the load 16 includes a transistor 20 with its base connected to ground via a resistor 22 and an optional delay element 24 and a decoupling capacitor 26 connected between the collector of transistor 20 and ground. A capacitor 28 and a switch 29 represent a capacitive loading of the power supply, for example caused by powering another circuit from the same power supply 18.

Figure 2:
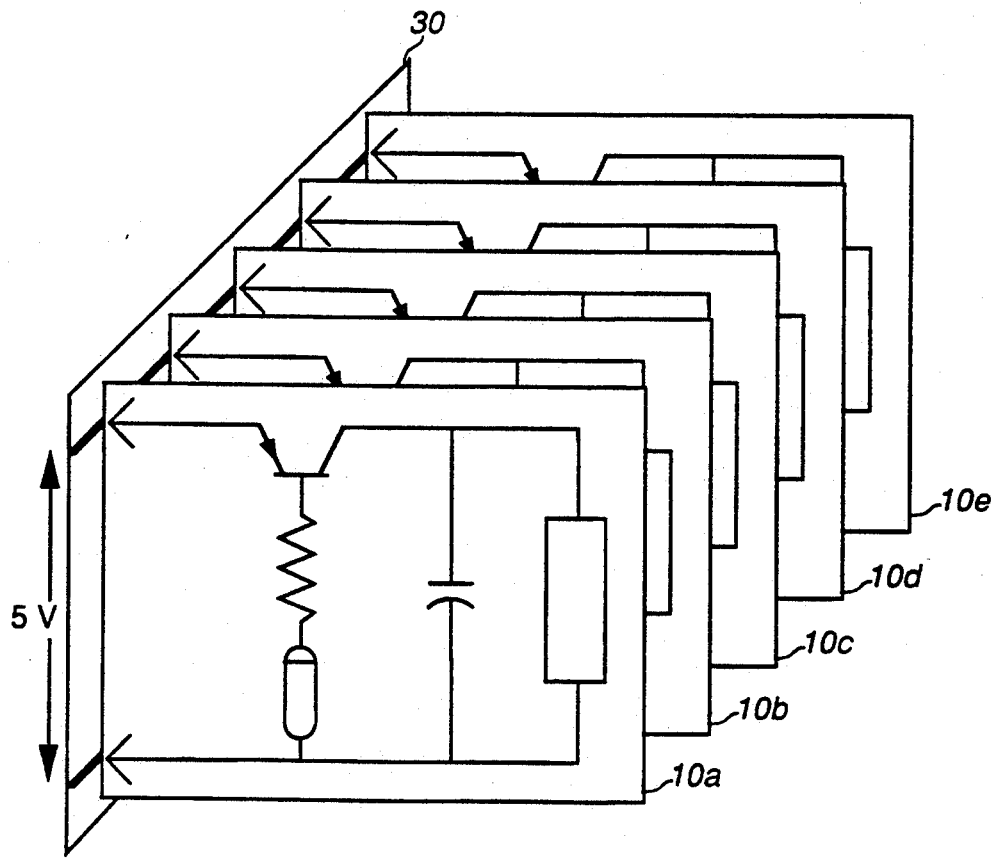
FIG. 2 illustrates a plurality of circuits, each including the circuit of FIG. 1, connected to a backplane.

A plurality of circuits, each including the circuit of FIG. 1, connected to a backplane is illustrated in FIG. 2. Each circuit card 10a through 10e is edge-connected to a backplane 30 to receive power and to exchange signals in known manner. Each circuit card 10 includes the transient reduction circuit illustrated in FIG. 1.

In operation, application of +5 V to the emitter of transistor 20 turns the transistor on and drives it into saturation. Current flows from the emitter to the base and is limited by the resistor 22. The base current allows collector current to flow, which charges the decoupling capacitor 26, and supplies current to the load 16. The forward voltage drop from emitter to collector of the transistor 20 is less than 0.1 V. When the capacitive load 28 is switched across the +5 V power supply, as happens when another circuit card is plugged in, the voltage at the power supply voltage drops to some level below +5 V for a few milliseconds. The decoupling capacitor 26 begins to discharge through the load 16, but does so slowly enough to maintain a higher voltage at the collector of transistor 20 than voltage at the emitter of transistor 20. Since the base collector junction of a saturated transistor is reverse biased, the decoupling capacitor 26 holds the transistor base voltage at a transistor cut-off level for the duration of the supply voltage transient, or until the decoupling capacitor 26 discharges through the load 16 to a level that allows the transistor 20 to start conducting. Thus, the transistor 20, when in its cut-off state, prevents the decoupling capacitor from discharging back through the supply source. The amount of time the transistor 20 remains in cut-off is dependent upon the value of the load 16 and the decoupling capacitor 26, and upon the decay time of the disturbing transient.

The problem of capacitive loading of the power supply is particularly acute for 5 V power supplies. The (circuit of FIG. 1 when used with a +5 V power supply and a 40 mA load has, for example, the following component values: the resistor 22 is 4 kOhms, the capacitor 26 is 10 $\mu$Fd and the transistor 20 is a PNP type MMBTA56. For this example the forward voltage drop emitter to collector for transistor 20 is acceptable at less than 0.08 V, while a series connected Schottky diode would introduce an unacceptable drop of 0.25 V.

An advantage of the present invention is that the effectiveness of the decoupling capacitor is enhanced without having to increase its value.

Numerous modifications, variations and adaptations may be made to the particular embodiments of the invention described above without departing from the scope of the invention, which is defined in the claims.

What is claimed is:

1. In a circuit card having a resistive load for connection to a power supply shared with other circuit cards, a transient reduction circuit, comprising:
    inputs for connection to the power supply output and a reference potential;
    a transistor having an emitter connected to the power input, a collector connected to the load and a base;
    a resistor connected between the base and the reference potential input; and
    a decoupling capacitor connected between the collector and the reference potential input;
    whereby a sudden decrease in power supply voltage output is prevented from discharging the decoupling capacitor by a reverse biased junction in the transistor.

2. A transient reduction circuit as claimed in claim 1 further comprising a delay element connected between the resistor and the reference potential input.

3. An arrangement including a backplane having at least two conductors, a power supply connected to the conductors, and a plurality of circuit cards attached to the backplane and connected to the conductors, each of the plurality of circuit cards including a transient reduction circuit comprising:
    inputs for connection to the power supply output and a reference potential;
    a transistor having an emitter connected to the power input, a collector connected to the load and a base;
    a resistor connected between the base and the reference potential input; and
    a decoupling capacitor connected between the collector and the reference potential input;
    whereby a sudden decrease in power supply voltage output is prevented from discharging the decoupling capacitor by a reverse biased junction in the transistor.

4. A transient reduction circuit as claimed in claim 3 further comprising a delay element connected between the resistor and the reference potential input.

* * * * *